(12) United States Patent
Sable et al.

(10) Patent No.: US 12,620,929 B2
(45) Date of Patent: May 5, 2026

(54) SOLAR TRACKER FOUNDATIONS

(71) Applicant: Nextpower LLC, Fremont, CA (US)

(72) Inventors: Abhimanyu Anil Sable, Hyderabad Telangana (IN); Raghavendra Praveen Maddulapalli, Hyderabad Telangana (IN)

(73) Assignee: NEXTPOWER LLC, Fremont, CA (US)

( * ) Notice: Subject to any disclaimer, the term of this patent is extended or adjusted under 35 U.S.C. 154(b) by 0 days.

(21) Appl. No.: 18/524,572

(22) Filed: Nov. 30, 2023

(65) Prior Publication Data

US 2025/0183839 A1 Jun. 5, 2025

(51) Int. Cl.
*H02S 20/32* (2014.01)
*H02S 20/30* (2014.01)

(52) U.S. Cl.
CPC .............. *H02S 20/32* (2014.12); *H02S 20/30* (2014.12)

(58) Field of Classification Search
CPC .................................. H02S 20/32; H02S 20/30
See application file for complete search history.

(56) References Cited

U.S. PATENT DOCUMENTS

| | | | |
|---|---|---|---|
| 8,347,514 B1 * | 1/2013 | McCollum | .............. E02D 27/42 |
| | | | 33/1 G |
| 8,920,077 B2 | 12/2014 | Kruse | |
| 9,207,000 B2 | 12/2015 | Kruse | |
| 10,837,677 B2 | 11/2020 | Hudson et al. | |

| | | | |
|---|---|---|---|
| 11,505,943 B2 | 11/2022 | Almy | |
| 2009/0229200 A1 * | 9/2009 | Noble | ..................... H02S 40/36 |
| | | | 248/176.1 |
| 2013/0048582 A1 | 2/2013 | Kruse | |
| 2013/0051927 A1 | 2/2013 | Kruse | |
| 2014/0224751 A1 | 8/2014 | Sawaki | |
| 2020/0072505 A1 | 3/2020 | Hudson et al. | |
| 2020/0076354 A1 | 3/2020 | West et al. | |

(Continued)

FOREIGN PATENT DOCUMENTS

| | | | |
|---|---|---|---|
| JP | 2013199791 | * 10/2013 | |
| JP | 2013199791 A | 10/2013 | |

(Continued)

OTHER PUBLICATIONS

International Searching Authority, "International Search Report and Written Opinion", From Application No. PCT/US2024/053515, Mailed Mar. 10, 2025, pp. 16.

*Primary Examiner* — Jayne L Mershon

(74) *Attorney, Agent, or Firm* — Fredrikson & Byron, P.A.

(57) ABSTRACT

A method for installing one or more solar module A-frame supports includes: creating a bore extending a depth below a ground surface, placing a temporary support jig adjacent the bore, inserting a leg of a solar module A-frame support into the bore such that a portion of the leg of the solar module A-frame support is within the bore and a portion of the leg of the solar module A-frame support contacts the temporary support jig, when the portion of the leg of the solar module A-frame support is within the bore and the portion of the leg of the solar module A-frame support contacts the temporary support jig, pouring concrete into the bore, and, after pouring concrete into the bore, removing the temporary support jig from contact with the leg of the solar module A-frame support.

14 Claims, 5 Drawing Sheets

(56)        References Cited

U.S. PATENT DOCUMENTS

| | | |
|---|---|---|
| 2020/0116394 A1 | 4/2020 | West et al. |
| 2021/0273603 A1* | 9/2021 | Almy .................... F24S 25/617 |
| 2022/0060140 A1 | 2/2022 | Attal et al. |
| 2025/0183839 A1 | 6/2025 | Sable et al. |

FOREIGN PATENT DOCUMENTS

| | | | |
|---|---|---|---|
| JP | 2019035214 | * | 3/2019 |
| JP | 6934356 B2 | | 9/2021 |

* cited by examiner

SOLAR TRACKER FOUNDATIONS

TECHNICAL FIELD

This disclosure relates generally to device, system, and method embodiments for solar tracker foundations. Certain such embodiments disclosed herein relate to concrete foundations for solar tracker A-frame supports.

BACKGROUND

Solar panels can convert sunlight into energy. As an example, solar thermal panels often convert electromagnetic radiation from the sun into thermal energy for heating homes, running certain industrial processes, or driving high grade turbines to generate electricity. As another example, solar photovoltaic panels convert sunlight directly into electricity for a variety of applications. Solar panels are generally composed of an array of solar cells, which are interconnected to each other. The cells are often arranged in series and/or parallel groups of cells in series. Accordingly, solar panels have great potential to benefit our nation, security, and human users. They can even diversify our energy requirements and reduce the world's dependence on oil and other potentially detrimental sources of energy.

Solar tracking systems can be used to dynamically orient a plurality of solar modules, for instance, by moving the solar modules throughout the course of a given day to track the movement of the sun and thereby increase the efficiency and productivity of the solar modules. However, because solar tracking systems apply motive force to move the solar modules, resulting forces can be imparted on the piles that support the movable solar modules. In addition, the solar modules can experience natural forces in the field, such as wind loads, which can create additional acting forces on the piles that support the movable solar modules.

SUMMARY

This disclosure in general describes embodiments of devices, systems, and methods relating to solar tracker foundations. Certain such embodiments disclosed herein relate to concrete foundations for solar tracker A-frame supports. Such embodiments disclosed herein can be configured to facilitate improved structural stability for solar tracking systems. In addition, embodiments disclosed herein can improve solar tracking system structural stability while increasing the efficiency of solar tracking foundation installation and reducing costs (e.g., foundation and/or support material costs) associated with solar tracker foundations and supports. As one example, certain embodiments disclosed herein may reduce solar module support (e.g., solar module A-frame support) material costs by up to 50% while yet at the same time provide increased structural stability for solar tracking systems by installing a more structurally robust foundation. Indeed, in some examples, certain solar module support (e.g., solar module A-frame support) features and certain foundation features can be synergistically complementary to achieve such benefits.

One embodiment includes a method for installing one or more solar module A-frame supports. This method embodiment includes creating a bore extending a depth below a ground surface; placing a temporary support jig adjacent the bore; inserting a leg of a solar module A-frame support into the bore such that a portion of the leg of the solar module A-frame support is within the bore and a portion of the leg of the solar module A-frame support contacts the temporary support jig; when the portion of the leg of the solar module A-frame support is within the bore and the portion of the leg of the solar module A-frame support contacts the temporary support jig, pouring concrete into the bore; and after pouring concrete into the bore, removing the temporary support jig from contact with the leg of the solar module A-frame support.

According to a further embodiment of this method, the temporary support jig is placed at the ground surface and above the bore. As one example, the temporary support jig includes a first jig leg and a second jig leg, and the first jig leg is placed at the ground surface above the bore at a first side of the bore and the second jig leg is placed at the ground surface above the bore at a second side of the bore different than the first side of the bore. For instance, the temporary support jig can define a leg receiving opening between the first jig leg and the second jig leg, and the leg of the solar module A-frame support is inserted into the bore such that the portion of the leg of the solar module A-frame support contacts the temporary support jig at the leg receiving opening between the first jig leg and the second jig leg. In some such instances, when the temporary support jig is placed at the ground surface and above the bore, the first jig leg and the second jig leg can contact the ground surface. And the leg receiving opening, defined between the first jig leg and the second jig leg, can be above the ground surface and aligned with the bore.

According to a further embodiment of this method, the temporary support jig can be removed from contact with the leg of the solar module A-frame support after the concrete poured into the bore has cured.

According to a further embodiment of this method, the leg of the solar module A-frame support is inserted into the bore such that the portion of the leg of the solar module A-frame support within the bore extends within the bore along an axis perpendicular to the ground surface. For example, the portion of the leg of the solar module A-frame support within the bore can be integral with the portion of the leg of the solar module A-frame support that contacts the temporary support jig.

According to a further embodiment of this method, the bore can be created to extend the depth below the ground surface such that a first portion of the bore at a first depth below the ground surface has a first bore width and a second portion of the bore at a second depth, different than the first depth, below the ground surface has a second bore width different than the first bore width. For example, the second depth can be further below the ground surface than the first depth, and the second bore width can be greater than the first bore width.

According to a further embodiment of this method, the bore is a first bore, the temporary support jig is a first temporary support jig, and the leg of the solar module A-frame support is a first leg of the solar module A-frame support. For such embodiment, the method can additionally include: creating a second bore extending a depth below the ground surface; placing a second temporary support jig adjacent the second bore; inserting a second leg of the solar module A-frame support into the second bore such that a portion of the second leg of the solar module A-frame support is within the second bore and a portion of the second leg of the solar module A-frame support contacts the second temporary support jig; when the portion of the second leg of the solar module A-frame support is within the second bore and the portion of the second leg of the solar module A-frame support contacts the second temporary support jig, pouring concrete into the second bore; and after pouring concrete into the second bore, removing the second temporary support jig from contact with the second leg of the solar module A-frame support. As one example, the first bore and the second bore can be created simultaneously.

According to a further embodiment of this method, the bore created to extend the depth below the ground surface can have a volume equal to or less than 0.15 cubic meters, and a volume of the concrete poured into the bore can be equal to or less than 0.15 cubic meters.

Another embodiment includes a solar module support and foundation system. This system embodiment includes a first foundation, a second foundation, and a solar module A-frame support. The first foundation includes a first bore extending a depth below a ground surface, and a first concrete foundation within the first bore. The second foundation includes a second bore extending a depth below the ground surface, and a second concrete foundation within the second bore. The solar module A-frame support includes a first leg, a second leg, and a bracket. The first leg has a first leg proximal end and a first leg distal end, with the first leg distal end nested within the first concrete foundation. The second leg has a second leg proximal end and a second leg distal end, with the second leg distal end nested within the second concrete foundation. The bracket is above the ground surface and adjacent the first leg proximal end and the second leg proximal end.

According to a further embodiment of this system, the first leg proximal end is integral with the first leg distal end, and the second leg proximal end is integral with the second leg distal end. The first leg distal end can be closed, and the second leg distal end can be closed.

According to a further embodiment of this system, the first leg of the solar module A-frame support is nested within the first concrete foundation so as to extend along a first axis perpendicular to the ground surface. Likewise, in this embodiment, the second leg of the solar module A-frame support is nested within the second concrete foundation so as to extend along a second axis perpendicular to the ground surface and spaced along the ground surface from the first axis.

According to a further embodiment of this system, the first bore has a first bore first width at a first depth below the ground surface and a first bore second width a second depth below the ground surface, where the second depth is further below the ground surface than the first depth and the first bore second bore width is greater than the first bore first width.

According to a further embodiment of this system, the bracket has a first bracket side that faces the first leg proximal end and the second leg proximal end and a second bracket side that is opposite the first bracket side. The second bracket side includes a support surface that includes a support surface end portion. The support surface end portion includes a coupling aperture and defines an elevational offset along the support surface equal to or greater than 50 mm.

According to a further embodiment of this system, the first concrete foundation and the second concrete foundation each include a concrete volume equal to or less than 0.15 cubic meters.

The details of one or more examples are set forth in the accompanying drawings and the description below. Other features, objects, and advantages will be apparent from the description and drawings, and from the claims.

BRIEF DESCRIPTION OF DRAWINGS

The following drawings are illustrative of particular examples of the present invention and therefore do not limit

Figure 1:
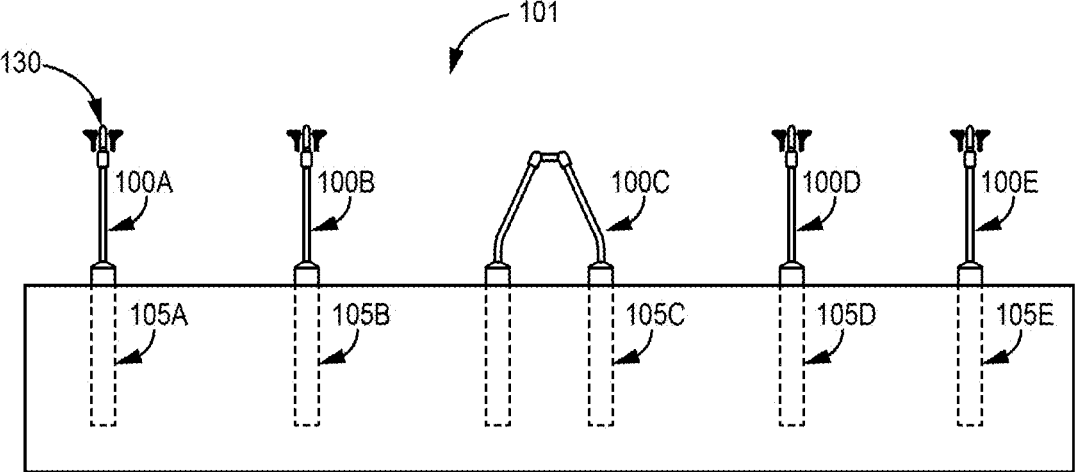

4 the scope of the invention. The drawings are intended for use in conjunction with the explanations in the following detailed description wherein like reference characters denote like elements. Examples of the present invention will hereinafter be described in conjunction with the appended drawings.

FIG. 1 is a side elevational view of an embodiment of a plurality of solar module support frames and associated foundations for use in a solar module tracking system. FIG. 1 shows the side elevational view looking in an east-west orientation.

Figure 2:
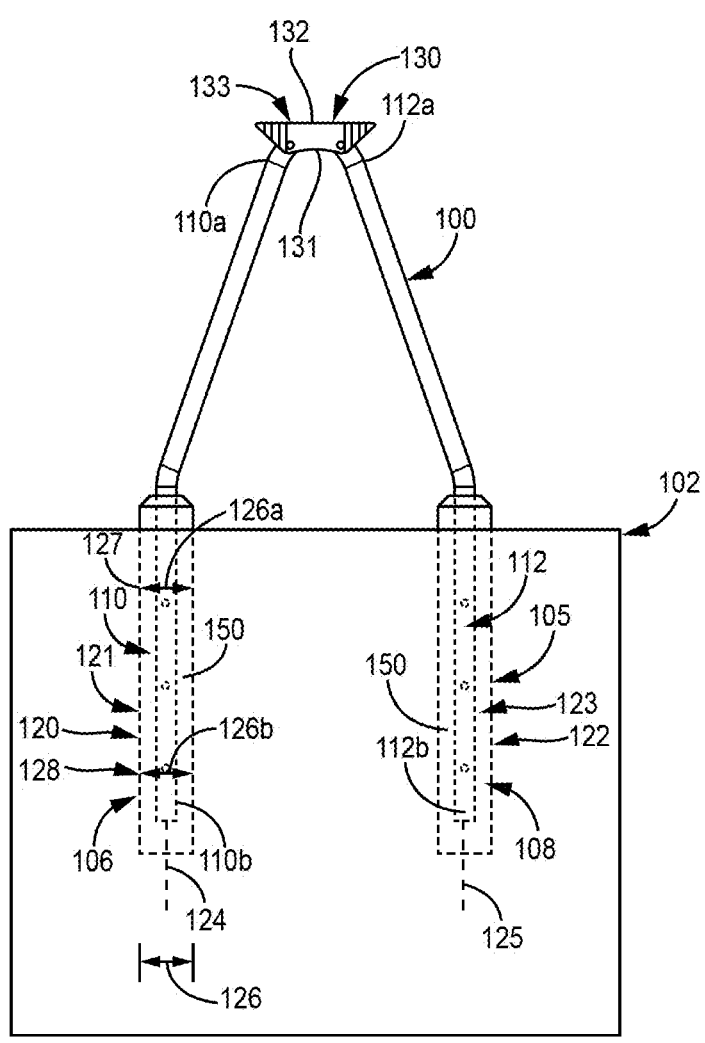

FIG. 2 is a side elevational view of an embodiment of one solar module support frame and associated foundation of FIG. 1.

Figure 3A:
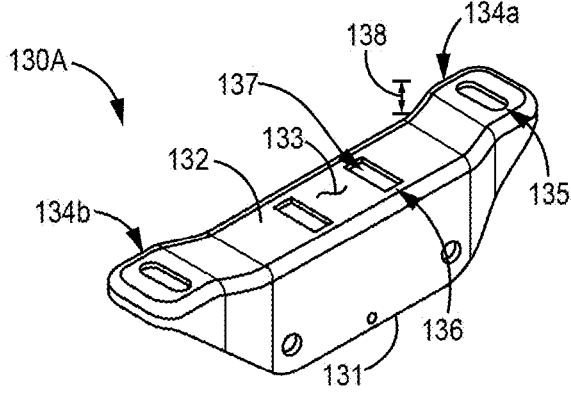
Figure 3B:
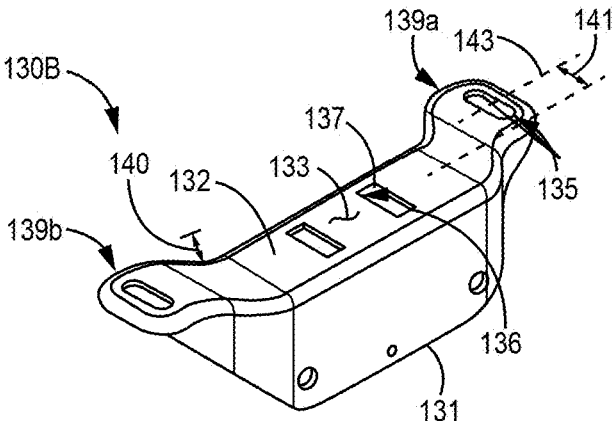

FIGS. 3A and 3B illustrate bracket embodiments for use with the solar module support frames of FIG. 1. FIG. 3A is a perspective view of one embodiment of a bracket, and FIG. 3B is a perspective view of another embodiment of a bracket.

Figure 4:
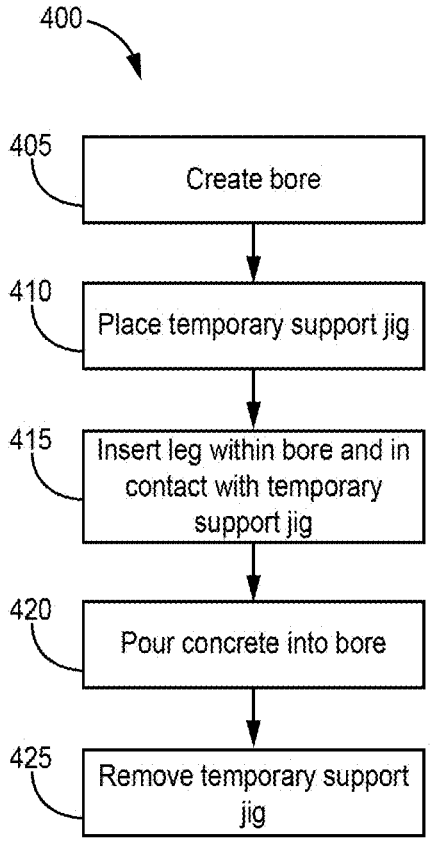

FIG. 4 is a flow diagram of an embodiment of a method for installing a solar module support frame at a concrete foundation.

Figures 5A, 5B, 5C, 5D, 5E:
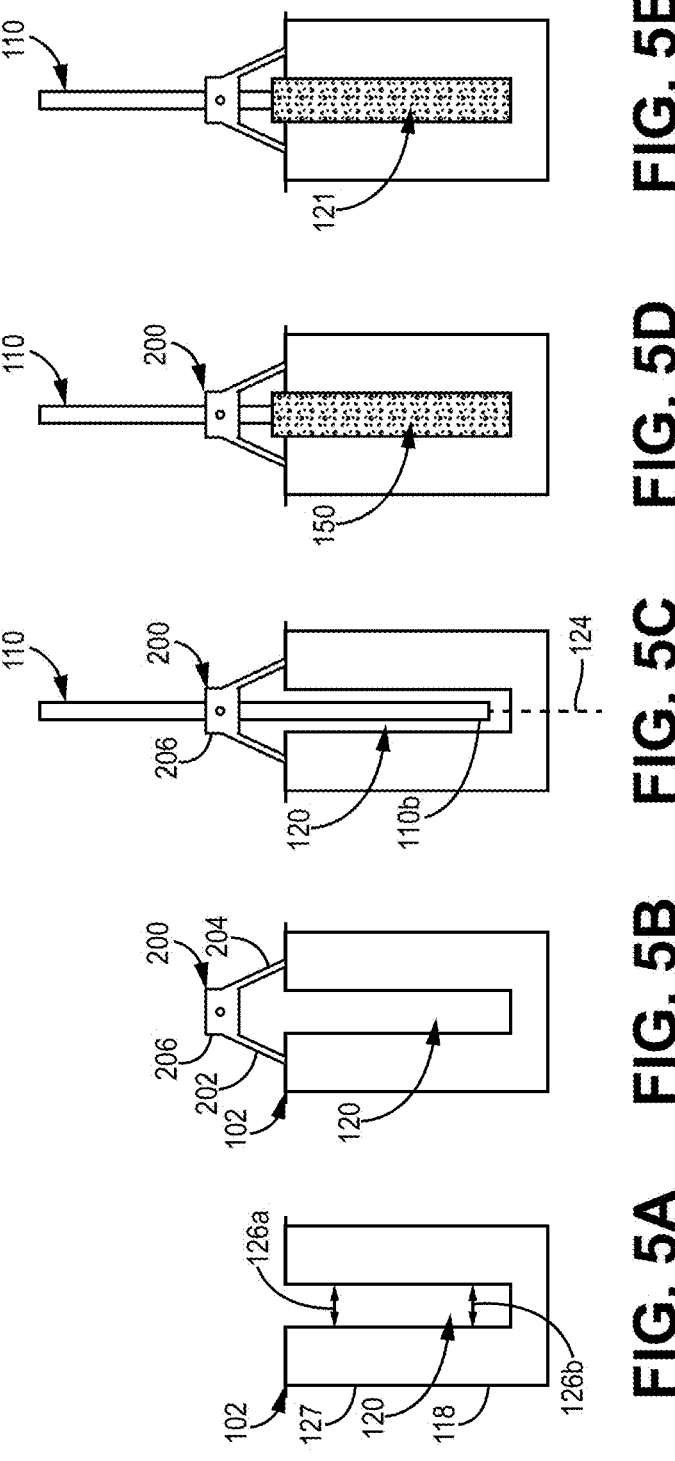

FIGS. 5A-5E illustrate an exemplary sequence for installing a solar module support frame at a concrete foundation, for instance, in accordance with some embodiments of the method of FIG. 4. FIG. 5A is a side elevational view of a first stage in the sequence, FIG. 5B is a side elevational view of a second stage in the sequence, FIG. 5C is a side elevational view of a third stage in the sequence, FIG. 5D is a side elevational view of a fourth stage in the sequence, and FIG. 5E is a side elevational view of a fifth stage in the sequence.

DETAILED DESCRIPTION

The following detailed description is exemplary in nature and is not intended to limit the scope, applicability, or configuration of the invention in any way. Rather, the following description provides some practical illustrations for implementing examples of the present invention. Those skilled in the art will recognize that many of the noted examples have a variety of suitable alternatives.

Embodiments disclosed herein include various devices, systems, and methods relating to solar tracker foundations. Certain such embodiments disclosed herein relate to concrete foundations for solar tracker A-frame supports configured to facilitate improved structural stability for solar tracking systems. Certain such embodiments disclosed herein can improve solar tracking system structural stability while increasing the efficiency of solar tracking foundation installation and reducing costs (e.g., foundation and/or support material costs) associated with solar tracker foundations and supports.

FIG. 1 is a is a side elevational view of an embodiment of a system 101 that includes a plurality of solar module support frames 100A, 100B, 100C, 100D, 100E and associated foundations 105A, 105B, 105C, 105D, 105E. FIG. 1 shows the system 100 at a side elevational view looking in an east-west orientation at the solar module support frames 100A-100E and respective, associated foundations 105A-105E. As illustrated, the solar module support frames 100A, 100B, 100D, 100E can be oriented in one direction, while the solar module support frame 100C can be oriented in a different direction, such as generally ninety degrees offset from the solar module support frames 100A, 100B, 100D, 100E. For instance, the solar module support frames 100A, 100B, 100D, 100E can face one of east-west and north-south while the solar module support frame 100C can face the other of east-west and north-south.

The system 101 that includes the solar module support frames 100A-100E and respective, associated foundations 105A-105E can be used to support a solar module tracking system. For example, the solar module support frames 100A-100E and respective, associated foundations 105A-105E can be used to support a solar module tracking system that includes one or more solar modules, one or more mounting assemblies, and a torque tube. Each of the one of more solar modules can include a frame and a plurality of photovoltaic cells that are configured to receive sunlight and as a result generate electrical energy. Each mounting assembly can connect at least one solar module to the torque tube, and the torque tube can be configured to rotatably move one or more such solar modules. The torque tube can be actuated by a controller to cause the torque tube to move, such as rotate about a longitudinal axis of the torque tube. As such, with one or more solar modules coupled to the torque tube via one or more mounting assemblies, as the torque tube is moved the one or more solar modules coupled to the torque tube are also moved. This can facilitate more optimized solar power generation at the photovoltaic cells by adjusting the angle of the one or more solar modules at one or more times (e.g., at times during a given day) to help "track" the sun as it moves over that period of time and, thereby, maintain more optimized positioning of the photovoltaic cells relative to the angle of sunlight irradiation at that given time of the day.

The solar module support frames 100A-100E and respective, associated foundations 105A-105E used to support a solar module tracking system can experience a variety of force loads. For example, the solar module support frames 100A-100E and respective, associated foundations 105A-105E can experience dynamic loads in the field from natural forces, such as wind loads. As another example, the solar module support frames 100A-100E and respective, associated foundations 105A-105E can experience dynamic loads in the field resulting from operation of the solar module tracking system, such as loads on the solar module support frames 100A-100E and respective, associated foundations 105A-105E resulting from movement (e.g., rotation) of the torque tube that can be supported at the solar module support frames 100A-100E. In some instances, these loads can occur at a same time, resulting in meaningful force loading at the solar module support frames 100A-100E.

Accordingly, it can be useful to accommodate such loads experienced at the solar module support frames 100A-100E using a structurally robust foundation for the solar module support frames 100A-100E. Yet, because a typical solar module tracking system can include hundreds or thousands of solar module support frames 100A-100E each needing a dedicated foundation 105A-105E, material/cost and installation efficiency of the associated foundations 105A-105E can be useful.

FIG. 2 is a side elevational view of an embodiment of one solar module support frame 100 and associated foundation 105. The solar module support frame 100 and associated foundation 105 can, in some applications, be part of the system 101 shown and described with respect to FIG. 1.

The illustrated embodiment of the foundation 105, associated with the solar module A-frame support 100, includes a first foundation 106 and a second foundation 108. The first foundation 106 can include a first bore 120 and a first concrete foundation 121. The first bore 120 can extend a depth below a ground surface 102, and the first concrete foundation 121 can be within (e.g., at least partially within)

the first bore 120. The second foundation 108 can include a second bore 122 and a second concrete foundation 123. The second bore 122 can extend a depth below the ground surface 192, and the second concrete foundation 123 can be within (e.g., at least partially within) the second bore 122. In some examples, the first bore 120 and the second bore 122 can be created at a same time to extend into the ground surface 102 to a predetermined depth. The first concrete foundation 121 and the second concrete foundation 123 can each have a concrete volume equal to or less than 0.50 cubic meters, equal to or less than 0.25 cubic meters, equal to or less than 0.15 cubic meters, or equal to or less than 0.10 cubic meters. Such concrete volume for each concrete foundation 121, 123 can be a relatively little volume optimized for the solar tracking system loading expected to be experienced in the field and in view of the other components and characteristics of the foundation 105 such that a cost savings associated with concrete material needed across a solar tracking system application can be realized.

The first foundation 106 can be separate from the second foundation 108. For example, as illustrated at the example of FIG. 2, the first bore 120 can be a separate bore from the second bore 122 and, likewise, the first concrete foundation 121 can be a separate concrete foundation from the second concrete foundation 123. In such examples where the first foundation 106 is separate from the second foundation 108, the first foundation 106 can be separated from the second foundation 108 by a region therebetween that is generally at the elevation of the ground surface 102 without any bore at this region between the first and second foundations 106, 108.

The first and second bores 120, 122 can be created to extend below the ground surface 102 in a manner that can provide sufficient structural anchoring and stability to the respective first and second legs 110, 112 of the solar module support frame 100. As one example, the first and second bores 120, 122 can be created to extend below the ground surface 102 a depth greater than a length of the respective first and second legs 110, 112 to be nested within the respective bore 120, 122. As an additional example, a cross-sectional width 126 of the respective bore 120, 122 can be created to be larger than a width of the respective first and second legs 110, 112 to be nested within the respective bore 120, 122. In some embodiments, the cross-sectional width 126 of the respective bore 120, 122 can vary along a depth of the respective bore 120, 122. For instance, the first bore 120 can have a first bore first width 126a at a first depth 127 below the ground surface 102 and a first bore second width 126b a second depth 128 below the ground surface. In one such example, the second depth 128 can be further below the ground surface 102 than the first depth 127 and the first bore second bore width 126b can be greater than the first bore first width 126a. In such an example where the first and/or second bore 120, 122 includes a larger bore cross-sectional width at a relatively deeper location, this can help to provide additional anchoring stability to the respective leg 110, 112 that is be nested within the respective bore 120, 122.

The illustrated embodiment of the solar module support frame 100 is a solar module A-frame support 100. The solar module A-frame support 100 can include the first leg 110 and the second leg 112. The first leg 110 can be connected to the second leg 112, either integrally or via a connecting member, to form the A-frame support 100. The first leg 110 can include a first leg proximal end 110a and a first leg distal end 110b. The first leg distal end 110b can be nested within the first concrete foundation 121. In one example, such as that shown for the illustrated embodiment, the first leg 110 of the solar module A-frame support 100 can be nested within the first concrete foundation 121 so as to extend along a first axis 124 (e.g., a central longitudinal axis 124 defined by the first leg distal end 110b) that is perpendicular to the ground surface 102. The illustrated example shows the solar module A-frame support 100 having the first leg 110 with a first leg subterranean portion, beneath the ground surface 102 and within the bore 120, that includes the first leg distal end 110b and a linear first leg portion extending along the axis 124, while the first leg 110 has a first leg above ground portion that is skewed relative to the first leg subterranean portion and thus offset from the axis 124. The second leg 112 can include a second leg proximal end 112a and a second leg distal end 112b. The second leg distal end 112b can be nested within the second concrete foundation 123. In one example, such as that shown for the illustrated embodiment, the second leg 112 of the solar module A-frame support 100 can be nested within the second concrete foundation 123 so as to extend along a second axis 125 (e.g., a central longitudinal axis 125 defined by the second leg distal end 112b) that is perpendicular to the ground surface 102. The second axis 125 can be spaced along the ground surface 102 from the first axis 124, and, in some instances, the first and second axes can be parallel to one another. The illustrated example shows the solar module A-frame support 100 having the second leg 112 with a second leg subterranean portion, beneath the ground surface 102 and within the bore 122, that includes the second leg distal end 112b and a linear second leg portion extending along the axis 125, while the second leg 112 has a second leg above ground portion that is skewed relative to the second leg subterranean portion and thus offset from the axis 125.

The illustrated embodiment of the solar module A-frame support 100 has the first leg distal end 110b closed and the second leg distal end 112b closed. Closed distal ends 110b, 112b of the legs 110, 112 can be useful in reducing or preventing egress of matter into the interior of the legs 110, 112 (e.g., to help reduce of prevent egress of subterranean ground matter, such as rock and soil, and/or foundation material, such as cement/concrete).

The illustrated embodiment of the solar module A-frame support 100 includes the first leg 110 and the second leg 112 as integral legs. For example, the illustrated embodiment of the solar module A-frame support 100 includes the first leg proximal end 110a integral with the first leg distal end 110b and includes the second leg proximal end 112a integral with the second leg distal end 112b. Thus, the leg 110, 112 portion(s) above ground surface 102 and the leg 110, 112 portions below ground surface 102 (subterranean leg portion(s)) can be integral. In a further such example the solar module A-frame support 100 can include the first leg 110 integral with the second leg 112 such that the first leg proximal end 110a is integral with the second leg proximal end 112a, through in another example the first leg 110 and the second leg 112 can be separate members connected together by a connecting member (e.g., via a bracket 130).

The solar module A-frame support 100 can additionally include the bracket 130. The bracket 130 can be above the ground surface 102, and the bracket 130 can be adjacent to the first leg proximal end 110a and the second leg proximal end 112a. For example, the bracket 130 can be configured to support thereat one or more components of a solar module tracking system. As one particular such example, the bracket 130 can be configured to support a rotatable torque tube of the solar module tracking system. This could include, for instance, a bearing housing assembly support at the bracket 130, and the bearing housing assembly rotatably receiving the torque tube. The bracket 130 can include a first bracket side 131 that faces the first leg proximal end 110a and the second leg proximal end 112a and a second bracket side 132 that is opposite the first bracket side 131. The second bracket side 132 can include a support surface 133, and the support surface 133 can be configured to support one or more components of a solar module tracking system, such as a bearing housing assembly and a rotatable torque tube received at the bearing housing assembly.

FIGS. 3A and 3B illustrate different embodiments of the bracket 130 for use with the solar module support frame 100.

FIG. 3A is a perspective view of one embodiment of a bracket 130A. The bracket 130A has the first bracket side 131 that faces the first leg proximal end and the second leg proximal end as well as the second bracket side 132 that is opposite the first bracket side 131.

And the second bracket side 132 includes the support surface 133. The support surface 133 incudes at least one coupling aperture 136 defined thereat. The illustrated embodiment further incudes an interference member 137 at the coupling aperture 136 to help facilitate coupling the bracket 130A to a corresponding mounting assembly (e.g., for a bearing housing assembly). The support surface 133 includes a first support surface end portion 134a and a second support surface end portion 134b. Each of the first support surface end portion 134a and the second support surface end portion 134b includes a coupling aperture 135. Each of the first support surface end portion 134a and the second support surface end portion 134b defines an elevational offset 138 along the support surface 133. The elevational offset 138 can result in the support surface 133 at the first and second support surface end portions 134a, 134b being offset in elevation from a more central portion of the support surface 133. For example, the elevational offset 138 at the first and second support surface end portions 134a, 134b can be equal to or greater than 50 mm.

FIG. 3B is a perspective view of another embodiment of a bracket 130B. The bracket 130B can be similar to the bracket 130A but define a different elevational offset and/or a different radial offset. The bracket 130B has the first bracket side 131 that faces the first leg proximal end and the second leg proximal end as well as the second bracket side 132 that is opposite the first bracket side 131. And the second bracket side 132, at the bracket 130B, includes the support surface 133. The support surface 133 incudes at least one coupling aperture 136 defined thereat along with the interference member 137. The support surface 133 at the bracket 130B includes a first support surface end portion 139a and a second support surface end portion 139b. Each of the first support surface end portion 139a and the second support surface end portion 139b includes a coupling aperture 135. Each of the first support surface end portion 139a and the second support surface end portion 139b can define an elevational offset 140 along the support surface 133. The elevational offset 140 can result in the support surface 133 at the first and second support surface end portions 139a, 139b being offset in elevation from a more central portion of the support surface 133 at the bracket 130B. For example, the elevational offset 140 at the first and second support surface end portions 139a, 139b can be equal to or greater than 90 mm. The bracket 130B can, in addition to the elevational offset 140, in some embodiments include a radial offset 141. The illustrated embodiment of the bracket 130B includes the radial offset 141 that orients the first support surface end portion 139a offset from the second support surface end portion 139b. For example, the second support surface end portion 139*b* can be on the central radial axis 142 of the body of the bracket 130B, while the first support surface end portion 139*a* can be offset from the central radial axis 142 of the body of the bracket 130B. As shown, the first support surface end portion 139*a* can define a first support surface end portion radial axis 143 that is offset from the central radial axis 142 of the body of the bracket 130B by the distance of the radial offset 141.

In some embodiments of the system 101 shown at FIG. 1, the system 101 can include both the bracket 130A embodiment shown at FIG. 3A and the bracket 130B embodiment shown at FIG. 3B. For example, one or more of the solar module support frames 100A-100E can include the bracket 130A, while one or more others of the solar module support frames 100A-100E can include the bracket 130B. For instance, a majority of the solar module support frames 100A-100E can include the bracket 130A, while a minority of the solar module support frames 100A-100E can include the bracket 130B. The use of the bracket 130A at some of the solar module support frames 100A-100E and the use of the bracket 130B at others of the solar module support frames 100A-100E can be useful in providing greater installation tolerance when installing the solar module support frames 100A-100E and the bearing housing assembly and/or rotatable torque tube to be supported thereat. For instance, the greater tolerance provided by the variable elevation offset brackets 130A, 130B can be useful in installing the bearing housing assembly and/or rotatable torque in support at the solar module support frames 100A-100E given that the associated concrete foundations 105A-105E can generally be undesirable to reinstall in a manner to accommodate the installation of the bearing housing assembly and/or rotatable torque in support at the solar module support frames 100A-100E.

FIG. 4 is a flow diagram of an embodiment of a method 400 for installing a solar module support frame at a concrete foundation. For example, the method 400 can be executed to install the solar module A-frame support 100 and associated foundation 105, such as disclosed previously herein, for instance in reference to FIGS. 1 and 2. Thus, the method 400 can be executed to incorporate any one or more features disclosed previously herein with respect to the solar module A-frame supports and associated foundations. To help illustrate one exemplary application of the method 400, FIGS. 5A-5E will be referenced for illustrative purposes showing non-limiting examples of certain steps in the method 400. FIGS. 5A-5E illustrate an exemplary sequence for installing a solar module support frame at a concrete foundation, for instance, in accordance with some embodiments of the method 400. FIG. 5A is a side elevational view of a first stage in the sequence, FIG. 5B is a side elevational view of a second stage in the sequence, FIG. 5C is a side elevational view of a third stage in the sequence, FIG. 5D is a side elevational view of a fourth stage in the sequence, and FIG. 5E is a side elevational view of a fifth stage in the sequence.

At step 405, the method 400 includes creating bore 120 extending a depth below ground surface 102. As one example, the bore created to extend the depth below the ground surface 102 can have a volume equal to or less than 0.15 cubic meters (e.g., and a volume of the concrete poured into the bore, at step 420 can be equal to or less than 0.15 cubic meters). An another example, referring to FIG. 5A, the bore 120 can be created to extend the depth below the ground surface 102 such that a first portion of the bore at the first depth 127 below the ground surface 102 has a first bore width 126*a* and a second portion of the bore at a second depth 128, different than the first depth 127, below the ground surface 102 has a second bore width 126*b*. The first bore width 126*a* can be the same as or different than the second bore width 126*b*. As one example of creating the bore 120 at step 405, the second depth 128 can be further below the ground surface 102 than the first depth 127, and the second bore width 126*b* can be greater than the first bore width 126*a*.

Step 405 can include creating more than one bore. For example, step 405 can include creating the first bore 120 and the second bore 122 for a single A-frame support. In such an example, in some applications step 405 can be executed to create the first bore 120 and the second bore 122 simultaneously. Creating the first and second bores 120, 122 simultaneously can be helpful to minimize soil disturbance to the adjacent A-frame leg.

At step 410, the method 400 includes placing a temporary support jig 200 adjacent the bore 120 created at step 405. For applications of the method 400 where two bores are created (e.g., simultaneously) at step 405, step 410 can include placing a first temporary support jig adjacent the first bore 120 and a second temporary support jig adjacent the second bore 122.

Referring to the example shown at FIG. 5B, the temporary support jig 200 can be placed adjacent the bore 120 by placing the temporary support jig 200 at the ground surface 102 and above the bore 120 which extends a depth into the ground surface 102. The temporary support jig 200 can include a first jig leg 202 and a second jig leg 204. The first jig leg 202 can be placed at the ground surface 102 above the bore 120 at a first side of the bore 120 and the second jig leg 204 can be placed at the ground surface 102 above the bore 120 at a second side of the bore 120 different than the first side of the bore at which the first jig leg 202 is positioned. The temporary support jig 200 can further include a leg receiving opening 206 that is defined between the first jig leg 202 and the second jig leg 204. For example, as shown at the exemplary illustration at FIG. 5B, at step 410, the temporary support jig 200 can be placed at the ground surface 102 and above the bore 120 by placing the first jig leg 202 and the second jig leg 204 in contact with the ground surface 102 with the leg receiving opening 206, defined between the first and second jig legs 202, 204, positioned above the ground surface 102 and in axial alignment with the bore 120.

At step 415, the method 400 includes inserting a leg of a solar module A-frame support into the bore. For applications of the method 400 where two bores are created (e.g., simultaneously) at step 405, step 415 can include inserting a first leg of a solar module A-frame support into the first bore 120 and a second leg of the solar module A-frame support into the second bore 122.

Referring to the example shown at FIG. 5C, the leg 110 of the solar module A-frame support can be inserted into the bore 120 at step 415 such that a portion of the leg 110 of the solar module A-frame support contacts the temporary support jig 200. For example, the leg 110 of the solar module A-frame support can be inserted into the bore 120 at step 415 such that a portion of the leg 110 of the solar module A-frame support contacts the temporary support jig 200 at the leg receiving opening 206 between the first jig leg 202 and the second jig leg 204. For instance, the portion of the leg 110 of the solar module A-frame support placed into contact with the temporary support jig 200 can be a linear portion of the leg 110 that includes the leg distal end 110*b* and is to be at least partially embedded below the ground surface 102. At step 415, the 110 leg of the solar module A-frame support can be inserted into the bore 120 such that the portion of the leg 110 of the solar module A-frame support within the bore 120 extends within the bore 120 along axis 124 that is perpendicular to the ground surface 102. In some examples, the portion of the leg 110 of the solar module A-frame support within the bore 120 can be integral with the portion of the leg 110 of the solar module A-frame support that contacts the temporary support jig 200.

At step 420, the method 400 includes pouring concrete into the bore. For applications of the method 400 where two bores are created (e.g., simultaneously) at step 405, step 420 can include pouring concrete into each of the first and second bores 120, 122.

Referring to the example shown at FIG. 5D, concrete 150 can be poured into the bore 120 when the portion of the leg 110 of the solar module A-frame support is within the bore 120 and the portion of the leg 110 of the solar module A-frame support contacts the temporary support jig 200. Accordingly, the temporary support jig 200 can be useful in structurally supporting the leg 110 placed in the bore 102 while the foundation (e.g., concrete) cures. At step 420, the volume of concrete poured into each bore can be equal to or less than 0.50 cubic meters, equal to or less than 0.25 cubic meters, equal to or less than 0.15 cubic meters, or equal to or less than 0.10 cubic meters.

At step 425, the method 400 includes removing the temporary support jig. For applications of the method 400 where two bores are created (e.g., simultaneously) at step 405, step 425 can include removing each of the temporary support jigs positioned adjacent each of the bores.

Referring to the example shown at FIG. 5E, at step 425, after pouring concrete into the bore, the temporary support jig 200 can be removed from contact with the leg 110 of the solar module A-frame support. For example, the temporary support jig 200 can be removed from contact with the leg 110 of the solar module A-frame support after the concrete poured into the bore 120 has cured. As one particular such example, at step 425, once the concrete poured into the bore 120 has cured to form the concrete foundation 121, the temporary support jig 200 can be removed from contact with the leg 110.

Various examples have been described. These and other examples are within the scope of the following claims.

What is claimed is:

1. A method for installing one or more solar module A-frame supports comprising:
    creating a bore extending a depth below a ground surface;
    placing a temporary support jig adjacent the bore, the temporary support jig comprising a first jig leg, a second jig leg, and a leg receiving opening that intersects a longitudinal axis of the first jig leg and a longitudinal axis of the second jig leg, wherein the temporary support jig is placed adjacent the bore such that the leg receiving opening is axially aligned with the bore;
    inserting a leg of a solar module A-frame support into the bore such that a portion of the leg of the solar module A-frame support is within the bore and a portion of the leg of the solar module A-frame support directly contacts the temporary support jig;
    when the portion of the leg of the solar module A-frame support is within the bore and the portion of the leg of the solar module A-frame support directly contacts the temporary support jig, pouring concrete into the bore; and
    after pouring concrete into the bore, removing the temporary support jig from direct contact with the leg of the solar module A-frame support.

12

2. The method of claim 1, wherein the temporary support jig is placed at the ground surface and above the bore.

3. The method of claim 2, wherein the first jig leg is placed at the ground surface above the bore at a first side of the bore and the second jig leg is placed at the ground surface above the bore at a second side of the bore different than the first side of the bore.

4. The method of claim 3, wherein the leg of the solar module A-frame support is inserted into the bore such that the portion of the leg of the solar module A-frame support directly contacts the temporary support jig at the leg receiving opening between the first jig leg and the second jig leg.

5. The method of claim 4, wherein, when the temporary support jig is placed at the ground surface and above the bore, the first jig leg and the second jig leg contact the ground surface and the leg receiving opening, defined between the first jig leg and the second jig leg, is above the ground surface and axially aligned with the bore such that a vertical axis, relative to ground, extends through the leg of the solar module A-frame support and through the leg receiving opening.

6. The method of claim 1, wherein the temporary support jig is removed from direct contact with the leg of the solar module A-frame support after the concrete poured into the bore has cured.

7. The method of claim 1, wherein the leg of the solar module A-frame support is inserted into the bore such that the portion of the leg of the solar module A-frame support within the bore extends within the bore along an axis perpendicular to the ground surface.

8. The method of claim 7, wherein the portion of the leg of the solar module A-frame support within the bore is integral with the portion of the leg of the solar module A-frame support that contacts the temporary support jig.

9. The method of claim 1, wherein the bore is created to extend the depth below the ground surface such that a first portion of the bore at a first depth below the ground surface has a first bore width and a second portion of the bore at a second depth, different than the first depth, below the ground surface has a second bore width different than the first bore width.

10. The method of claim 9, wherein the second depth is further below the ground surface than the first depth, and wherein the second bore width is greater than the first bore width.

11. The method of claim 1,
    wherein the bore is a first bore, the temporary support jig is a first temporary support jig, and the leg of the solar module A-frame support is a first leg of the solar module A-frame support, and further comprising:
    creating a second bore extending a depth below the ground surface;
    placing a second temporary support jig adjacent the second bore;
    inserting a second leg of the solar module A-frame support into the second bore such that a portion of the second leg of the solar module A-frame support is within the second bore and a portion of the second leg of the solar module A-frame support contacts the second temporary support jig;
    when the portion of the second leg of the solar module A-frame support is within the second bore and the portion of the second leg of the solar module A-frame support contacts the second temporary support jig, pouring concrete into the second bore; and after pouring concrete into the second bore, removing the second temporary support jig from contact with the second leg of the solar module A-frame support.

12. The method of claim 11, wherein the first bore and the second bore are created simultaneously.

13. The method of claim 1, wherein the bore created to extend the depth below the ground surface has a volume equal to or less than 0.15 cubic meters, and wherein a volume of the concrete poured into the bore is equal to or less than 0.15 cubic meters.

14. The method of claim 1, wherein the temporary support jig comprises a first jig leg and a second jig leg, and wherein the first jig leg and the second leg are a same length.

\* \* \* \* \*